(12) United States Patent
Howell et al.

(10) Patent No.: US 7,216,488 B2
(45) Date of Patent: May 15, 2007

(54) METHODS AND APPARATUS FOR COOLING TURBINE ENGINE COMBUSTOR IGNITION DEVICES

(75) Inventors: Stephen John Howell, West Newbury, MA (US); John Carl Jacobson, Melrose, MA (US); Barry Francis Barnes, Cambridge, MA (US); Ramy Michael Souri, West Roxbury, MA (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 10/894,483

(22) Filed: Jul. 20, 2004

(65) Prior Publication Data

US 2006/0016190 A1    Jan. 26, 2006

(51) Int. Cl.
*F02C 7/12* (2006.01)
*F02C 7/264* (2006.01)
(52) U.S. Cl. .................. 60/776; 60/39.821; 60/39.83
(58) Field of Classification Search ........... 60/39.821, 60/39.826, 39.827, 39.828, 39.83, 740, 776, 60/786
See application file for complete search history.

(56) References Cited

U.S. PATENT DOCUMENTS

| | | | | |
|---|---|---|---|---|
| 2,831,993 A | * | 4/1958 | Lentz | 60/39.827 |
| 2,926,495 A | * | 3/1960 | Benson et al. | 60/746 |
| 3,990,834 A | * | 11/1976 | DuBell et al. | 60/39.821 |
| 5,085,040 A | * | 2/1992 | Tilston | 60/39.827 |
| 6,314,739 B1 | | 11/2001 | Howell et al. | |
| 6,483,022 B1 | * | 11/2002 | Packard | 174/15.1 |
| 6,675,582 B2 | | 1/2004 | Monty et al. | |
| 6,735,949 B1 | | 5/2004 | Haynes et al. | |

* cited by examiner

*Primary Examiner*—L. J. Casaregola
(74) *Attorney, Agent, or Firm*—William Scott Andes; Armstrong Teasdale LLP

(57) ABSTRACT

An ignition device assembly for a gas turbine engine combustor includes a body and a shroud. The body extends from an inlet end to an outlet end, and the shroud extends circumferentially around at least a portion of the body, and axially from a first end to a tip end. The shroud includes a tip portion and a body portion. The body portion includes a plurality of metering openings and a plurality of first outlet openings. The plurality of metering openings are for channeling cooling air to the ignition device body, and the plurality of first outlet openings are for channeling spent cooling air from the ignition device body. The tip portion includes a plurality of discharge openings extending therethrough for channeling cooling from the ignition device body. The plurality of first outlet openings are between the shroud tip portion and the plurality of shroud metering openings.

20 Claims, 3 Drawing Sheets

US 7,216,488 B2

METHODS AND APPARATUS FOR COOLING TURBINE ENGINE COMBUSTOR IGNITION DEVICES

STATEMENT REGARDING FEDERALLY SPONSORED RESEARCH OR DEVELOPMENT

The U.S. Government may have certain rights in this invention pursuant to contract number DAAE07-00-C-N086.

BACKGROUND OF THE INVENTION

This invention relates generally to gas turbine engines, more particularly to combustors used with gas turbine engines.

Known turbine engines include a compressor for compressing air which is suitably mixed with a fuel and channeled to a combustor wherein the mixture is ignited within a combustion chamber for generating hot combustion gases. More specifically, at least some known combustors include a dome assembly, a cowling, and liners to channel the combustion gases to a turbine, which extracts energy from the combustion gases for powering the compressor, as well as producing useful work to propel an aircraft in flight or to power a load, such as an electrical generator. Moreover, at least some known combustors include ignition devices, such as ignitors, primer nozzles, and/or pilot fuel nozzles, which are used during pre-selected engine operations to facilitate igniting the mixture within the combustion gases.

Known ignition devices extend through an annular tower extending outwardly from the combustor, such that at least a portion of such ignition devices is exposed to high temperatures generated within the combustion chamber. Moreover, within recouperated engines, generally such ignition devices are exposed to higher temperatures than similar devices used with non-recouperated engines. Accordingly, because of the orientation and relative position of the primer nozzle within the combustor, at least some known ignition devices are cooled. Moreover, at least some known ignition devices include tip shrouds which are also cooled and extend circumferentially around an injection tip of the primer nozzles. However, in at least some known primer nozzles, the cooling flow to the tip shrouds is unregulated such that if a shroud tip burns off during engine operation, cooling air flows unrestricted past the injection tip, and may adversely affect primer nozzle performance.

Furthermore, because of the increased combustion temperatures generated within such recouperated engines, generally the combustor towers used within recouperated engines are taller and wider than those used in non-recouperated engines. Although the increased size of such towers facilitates reducing an amount of thermal interference created between the tower and the ignition device, the increased size of such towers may enable high temperature gases to recirculate in a gap defined between the tower and the ignition device. Over time, the recirculation of high temperature gases through the tower assembly may result in damage to the tower assembly and/or to the ignition device.

BRIEF DESCRIPTION OF THE INVENTION

In one aspect, a method for assembling a gas turbine engine is provided. The method comprises coupling a combustor including a dome assembly and a combustor liner that extends downstream from the dome assembly to a combustor casing that is positioned radially outwardly from the combustor, and providing an ignition device that includes a body and a shroud that extends circumferentially around at least a portion of the body and extends axially from a first end to a tip end, wherein a gap is defined between the shroud and the body. The method also comprises inserting the ignition device at least partially through the a tower assembly coupled to the combustor such that a tip portion of the device is positioned upstream from the tip end, and downstream from a body portion that extends between the first end and the tip portion, and securing the ignition device within the tower assembly such that a plurality of metering openings formed within the shroud body portion are in flow communication with a cooling source for channeling cooling fluid into the gap, and such that a portion of the cooling air is discharged from the gap through a plurality of first cooling openings formed within the body portion, and such that a portion of the cooling air is channeled from the gap through a plurality of discharge openings formed within the shroud tip portion.

In another aspect, an ignition device assembly for a gas turbine engine combustor is provided. The ignition device includes a body and a shroud. The body extends from an inlet end to an outlet end, and the shroud extends circumferentially around at least a portion of the body, and axially from a first end to a tip end. The shroud includes a tip portion and a body portion. The tip portion extends from the tip end to the first end. The body portion includes a plurality of metering openings and a plurality of first outlet openings. The plurality of metering openings are for channeling cooling air to the ignition device body, and the plurality of first outlet openings are for channeling spent cooling air from the ignition device body. The tip portion includes a plurality of discharge openings extending therethrough for channeling cooling from the ignition device body. The plurality of first outlet openings are between the shroud tip portion and the plurality of shroud metering openings.

In a further aspect, a combustion system for a gas turbine engine is provided. The combustion system includes a combustor, casing, and an ignition device assembly. The combustor includes a dome assembly and a combustor liner extending downstream from the dome assembly. The combustor liner defines a combustion chamber therein. The combustor casing extends around the combustor and the ignition device assembly extends partially through the combustor casing and the dome assembly. The ignition device includes a body and a shroud. The body extends from an inlet end to an outlet end, and the shroud extends circumferentially around at least a portion of the body, and axially from a first end to a tip end. The shroud includes a tip portion and a body portion. The tip portion extends from the tip end to the first end. The body portion includes a plurality of metering openings and a plurality of first outlet openings. The plurality of metering openings are for channeling cooling air to the ignition device body, and the plurality of first outlet openings are for channeling spent cooling air from the ignition device body. The tip portion includes a plurality of discharge openings extending therethrough for channeling cooling from the ignition device body. The plurality of first outlet openings are between the shroud tip portion and the plurality of shroud metering openings.

DETAILED DESCRIPTION OF THE INVENTION

Figure 1:
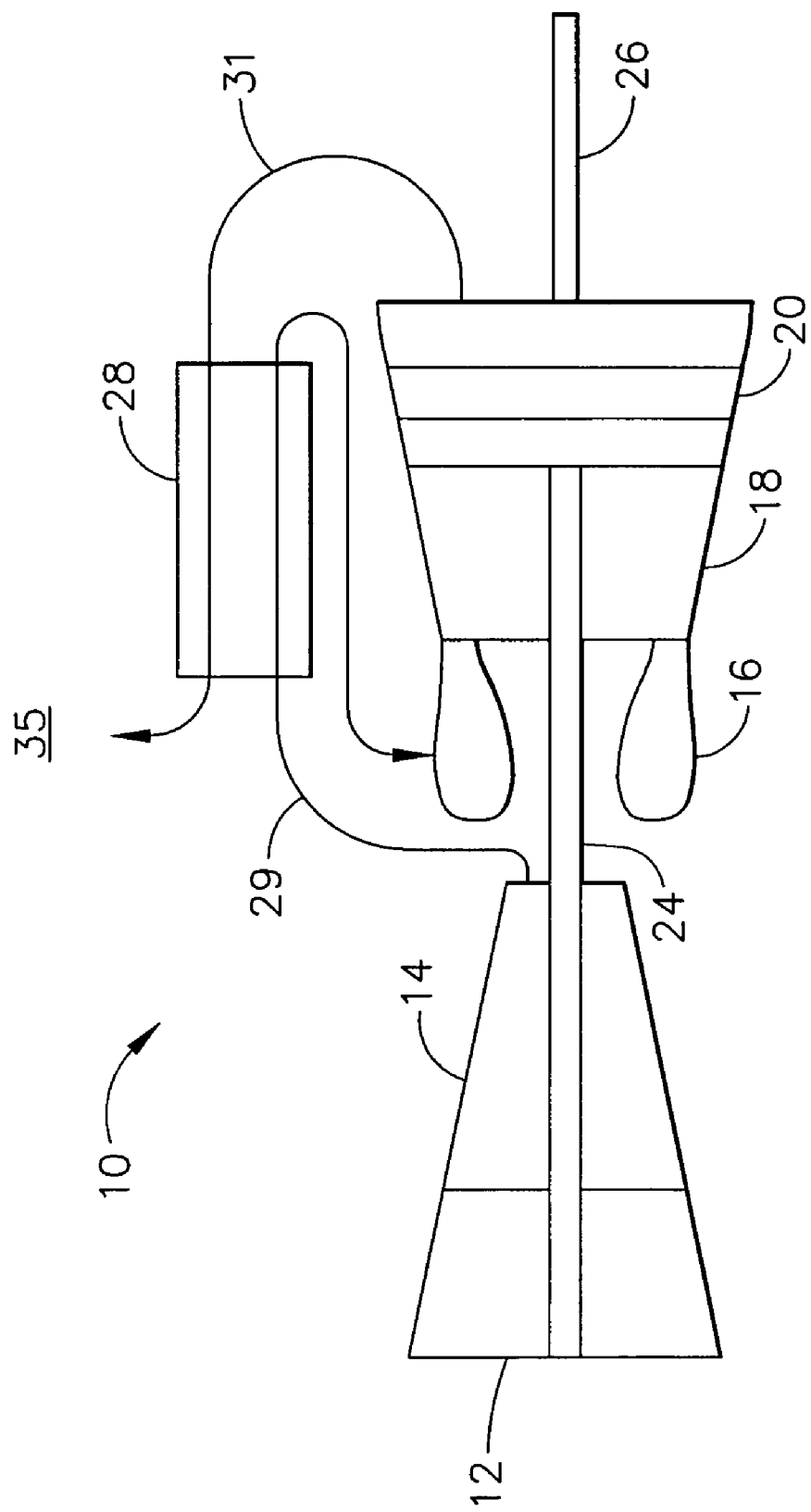
FIG. 1 is a schematic of an exemplary gas turbine engine.

FIG. 1 is a schematic illustration of an exemplary gas turbine engine 10 including a high pressure compressor 14, and a combustor 16. Engine 10 also includes a high pressure turbine 18 and a low pressure turbine 20. Compressor 14 and turbine 18 are coupled by a first shaft 24, and turbine 20 drives a second output shaft 26. Shaft 26 provides a rotary motive force to drive a driven machine, such as, but, not limited to a gearbox, a transmission, a generator, a fan, or a pump. Engine 10 also includes a recuperator 28 that has a first fluid path 29 coupled serially between compressor 14 and combustor 16, and a second fluid path 31 that is serially coupled between turbine 20 and ambient 35. In one embodiment, the gas turbine engine is an LV100 available from General Electric Company, Cincinnati, Ohio. In an alternative embodiment, engine 10 includes a low pressure compressor 12 coupled by a first shaft 24 to turbine 20, and compressor 14 and turbine 18 are coupled by a second shaft 26.

In operation, air flows through high pressure compressor 14. The highly compressed air is delivered to recuperator 28 where hot exhaust gases from turbine 20 transfer heat to the compressed air. The heated compressed air is delivered to combustor 16. Airflow from combustor 16 drives turbines 18 and 20 and passes through recuperator 28 before exiting gas turbine engine 10. In an alternative embodiment, during operation, air flows through low pressure compressor 12 and compressed air is supplied from low pressure compressor 12 to high pressure compressor 14. The highly compressed air is delivered to combustor 16. Airflow from combustor 16 drives turbines 18 and 20 before exiting gas turbine engine 10.

Figure 2:
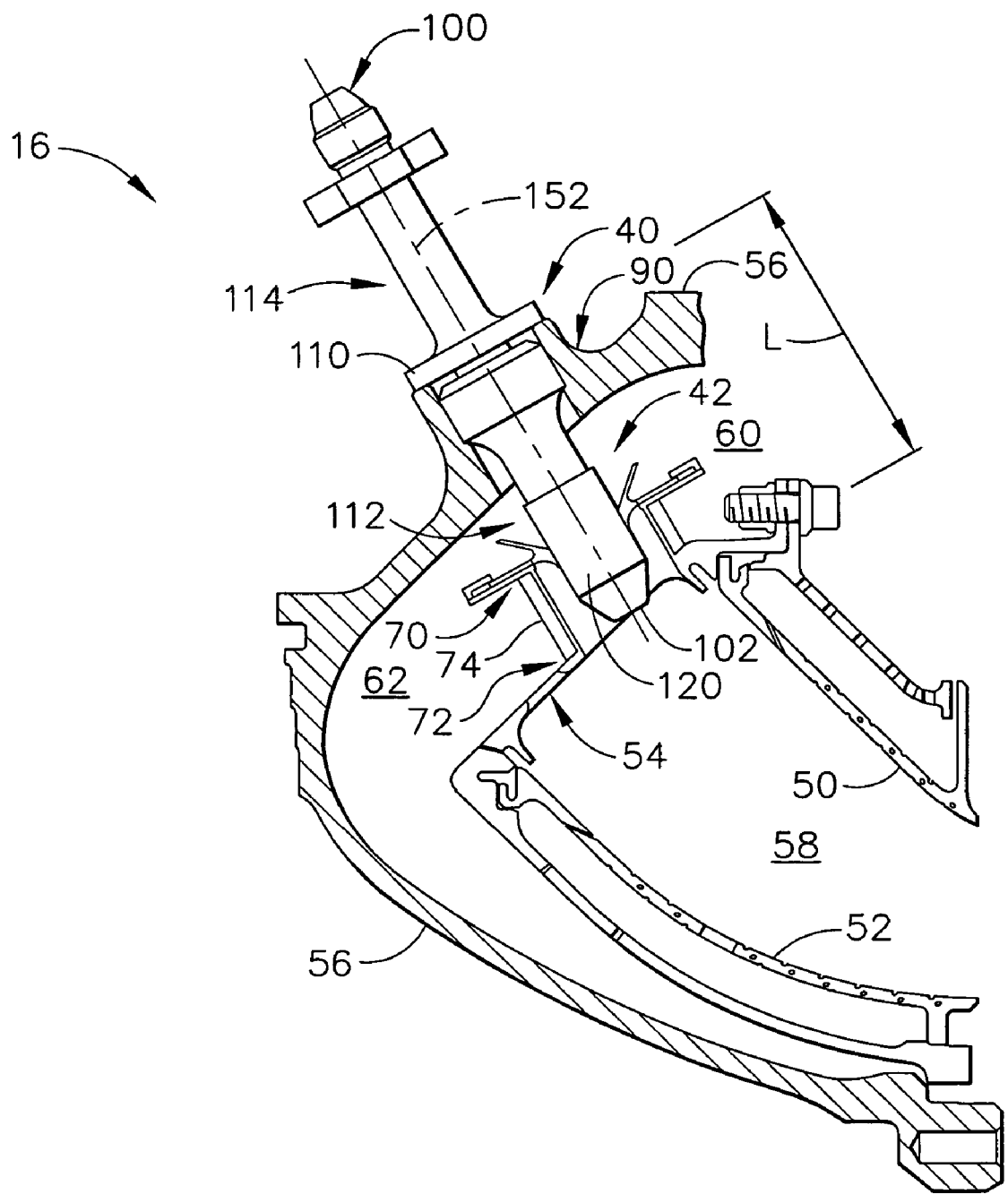
FIG. 2 is a cross-sectional illustration of a combustor used with the gas turbine engine shown in FIG. 1.
Figure 3:
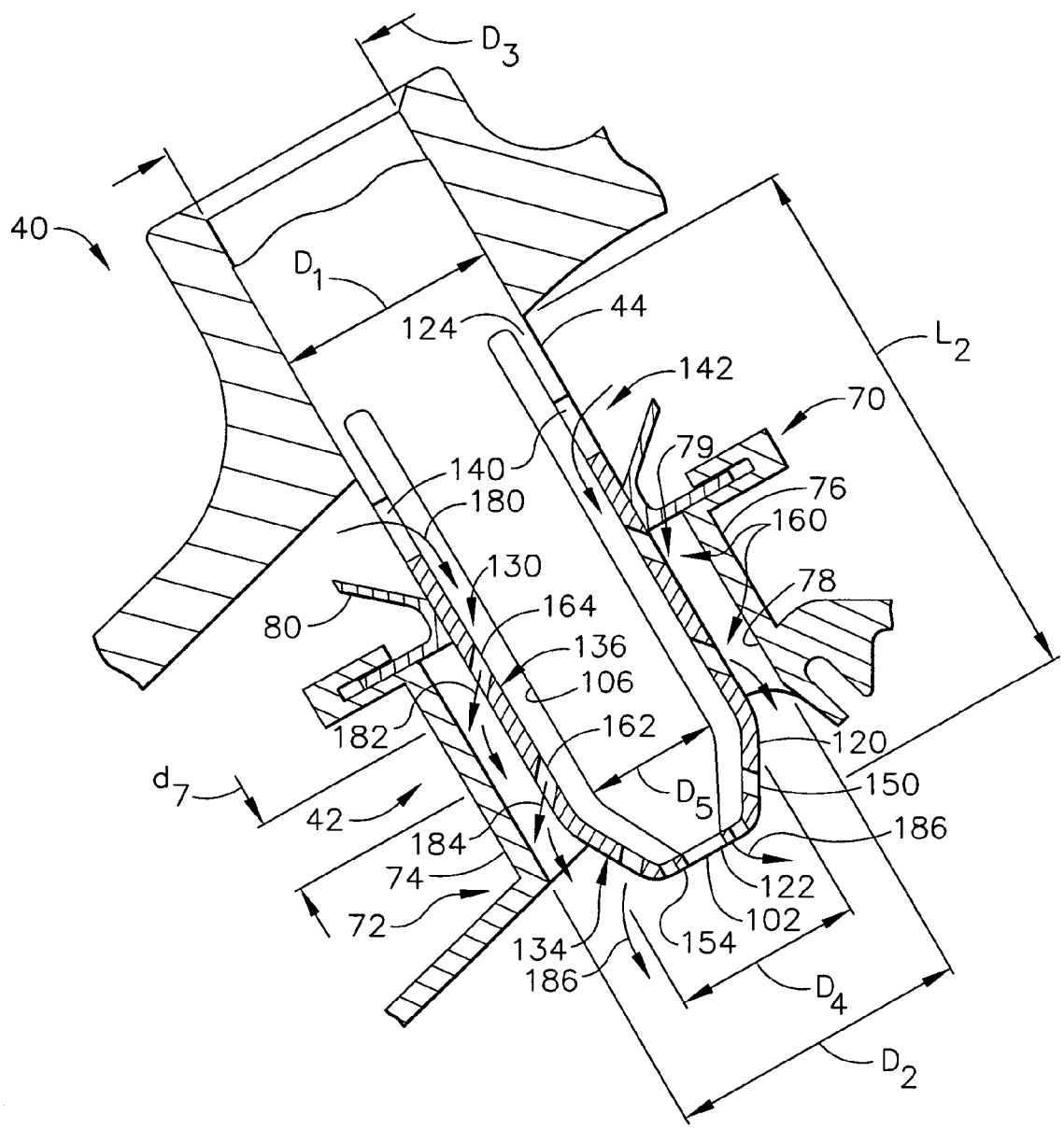
FIG. 3 is an enlarged side view of an exemplary ignition device used with the gas turbine engine shown in FIG. 2.

FIG. 2 is a cross-sectional illustration of a portion of combustor 16 including an exemplary ignition device assembly 40. FIG. 3 is an enlarged side view of a portion of ignition device assembly 40. Ignition device assembly 40 includes a tower assembly 42 and an ignition device 44. In the exemplary embodiment, ignition device 44 is pilot fuel injector used to supply fuel to engine 10 during pre-determined engine operating conditions, such as, but not limited to start-up operating conditions. In an alternative embodiment, ignition device 44 is an igniter used to ignite a fuel-air mixture within gas turbine engine 10.

Combustor 16 includes an annular outer liner 50, an annular inner liner 52, and a domed end 54 that extends between outer and inner liners 50 and 52, respectively. Outer liner 50 and inner liner 52 are spaced radially inward from a combustor casing 56 and define a combustion chamber 58 therebetween. Combustor casing 56 is generally annular and extends around combustor 16. Combustion chamber 58 is generally annular in shape and is radially between from liners 50 and 52. Outer liner 50 and combustor casing 56 define an outer passageway 60 and inner liner 52 and combustor casing 56 define an inner passageway 62. Outer and inner liners 50 and 52, respectively, extend to a turbine nozzle (not shown) that is downstream from domed end 54.

Tower assembly 42 is coupled to, and extends radially outwardly and upstream from combustor domed end 54. Tower assembly 42 includes an upstream end 70, a downstream end 72, and an annular body 74 extending therebetween. In the exemplary embodiment, body 74 is cylindrical and includes a radially outer surface 76 and an opposite radially inner surface 78. Inner surface 78 defines an opening 79 extending longitudinally through tower assembly 42 between upstream and downstream ends 70 and 72, respectively.

A ferrule 80 is coupled to tower assembly upstream end 70 and extends radially inward from upstream end 70. Accordingly, ferrule 80 has an inner diameter $D_1$ that is smaller than an inner diameter $D_2$ of tower assembly opening 79, and as described in more detail below, is slightly larger than an outer diameter $D_3$ defined by at least a portion of ignition device 44. Accordingly, as described in more detail below, when ignition device 44 is coupled to combustor 16, device 44 extends at least partially through ferrule 80 and tower assembly 42, such that ferrule 80 circumferentially contacts ignition device 44 to facilitate minimizing leakage from combustion chamber 58 between device 44 and ferrule 80.

In the exemplary embodiment, a portion of combustor casing 56 forms a boss 90 that facilitates aligning ignition device 44 with respect to combustor 16. Moreover, when ignition device 44 is inserted through boss 90, boss 90 facilitates limiting an insertion depth of device 44 with respect to combustor 16.

In the exemplary embodiment, ignition device 44 is a pilot fuel injector and includes an inlet 100, an injection tip 102, and a body 106 that extends therebetween. Inlet 100 is a known standard hose nipple that is coupled to a fuel supply source and to an air supply source for channeling either fuel or air into pilot fuel injector 44, as described in more detail below. In one embodiment, inlet 100 also includes a fuel filter (not shown) which strains fuel entering device 44 to facilitate reducing blockage within device 44.

In the exemplary embodiment, an annular shoulder 110 extends circumferentially around body 106 to facilitate positioning device 44 in proper orientation and alignment with respect to combustor 16 when device 44 is coupled to combustor 16. Accordingly, shoulder 110 separates ignition device body 106 into an internal portion 112 that is extended into combustor 16, and is thus exposed to high temperatures generated within combustion chamber 58, and an external portion 114 that remains external to combustor 16, and is thus not directly exposed to combustion chamber 58. More specifically, a length L of internal portion 112 is variably selected to facilitate limiting an amount of ignition device 44 exposed to radiant heat generated within combustion chamber 58. More specifically, the combination of length L and the relative position of shoulder 110 facilitates orienting ignition device 44 in an optimum position within combustor 16.

A shroud 120 extends circumferentially around ignition device 44 to facilitate shielding injection tip 102 and a portion of body internal portion 112 from heat generated within combustion chamber 58. Specifically, shroud 120 has a length $L_2$ that is shorter than internal portion length L, and a diameter $D_4$ that is larger than a diameter $D_5$ of internal portion 112 adjacent injection tip 102. Accordingly, shroud 120 extends from a tip face 122 to an upstream end 124. Shroud diameter $D_3$ is variably selected to be sized approximately equal to ferrule diameter $D_1$ to facilitate minimizing leakage from combustion chamber 58 between device 44 and ferrule 80. Moreover, because shroud diameter $D_4$ is larger than internal portion diameter $D_5$, an annular gap 130 is defined between shroud 120 and a portion of ignition device body 106.

Shroud 120 includes a tip portion 134 and a body portion 136. Tip portion 134 extends from tip face 122 to body portion 136. In the exemplary embodiment, tip portion 134 is frusto-conical, and body portion is substantially cylindrical.

In addition to shielding injection tip 102 and body internal portion 112, shroud 120 also facilitates cooling ignition device 44. Specifically, shroud 120 includes a plurality of metering openings 140 that extend through shroud 120 and are in flow communication with gap 130. In the exemplary embodiment, openings 140 are circumferentially-spaced in a row 142 extending around shroud 120. Openings 140 meter an amount of cooling airflow channeled towards shroud 120 in the event that shroud tip face 122 or tip portion 134 is burned back during combustor operations. In one embodiment, the cooling air supplied to shroud 120 is combustor inlet air that has been circulated through recouperator 28.

The frusto-conical shape of shroud tip portion 134 facilitates minimizing an amount of surface area exposed to radiant heat within combustor 16. Moreover, a plurality of shroud tip portion cooling openings 150 extend through, and are distributed across, shroud tip portion 134. Accordingly, in the exemplary embodiment, tip portion cooling openings 150 extend obliquely through shroud tip portion 134 with respect to a centerline axis of symmetry 152 extending through shroud 120. Tip portion openings 150 facilitate shielding injection tip 102 by providing an insulating layer of cooling air between shroud 120 and ignition device 44 within gap 130. In the exemplary embodiment, openings 150 are arranged in a pair of rows that extend circumferentially around tip portion 134.

Tip portion 134 also includes a plurality of tip openings 154 which extend from shroud tip face 122 into flow communication with gap 130. Specifically, openings 154 are substantially parallel to axis of symmetry 152 and channel air from gap 130 to facilitate preventing hot combustion gases from chamber 58 from attaching against tip surface 122. Moreover, the combination of tip openings 154 and tip portion openings 150 facilitate preventing hot combustion gases from entering gap 130 from chamber 58.

Shroud body portion 136 also includes a plurality of cooling air outlets 160. Specifically, shroud body portion 136 includes a plurality of intermediate cooling air openings 162 and a plurality of upstream cooling air openings 164. Openings 164 are upstream from openings 162, and are downstream from metering openings 140. In the exemplary embodiment, body portion 136 includes two rows of circumferentially-spaced openings 164 that extend obliquely through shroud body portion 136. Cooling air discharged from openings 164 into gap 79 impinges against tower assembly inner surface 78 to facilitate cooling tower assembly 42, and to provide a continuous channel flow for ventilating gap 79.

Openings 162 are a distance $d_7$ downstream from openings 164 and are upstream from shroud tip portion 134. In the exemplary embodiment, openings 162 extends obliquely through shroud body portion 136. Cooling air discharged from openings 162 into gap 79 also impinges against tower assembly inner surface 78 to facilitate additional cooling of tower assembly 42, and to provide additional channel flow for ventilating gap 79 and to provide a layer of cooling air to facilitate protecting body 136 and tip 134 from combustion gases.

During operation, ignition devices 44 are used to facilitate starting engine 10. After engine 10 is started and idle speed is obtained, fuel flow is shut off, such that at higher power operation, or during engine hot starts, ignition devices 44 may be susceptible to coking and tip burn back. To facilitate preventing coking within ignition devices 44, ignition devices 44 are substantially continuously purged with pressurized cooling air through inlet 100, when fuel flow is shut off.

Cooling air 180 supplied to ignition device assembly 40 facilitates reducing an operating temperature of ignition device 44 and tower assembly 42, and facilitates reducing thermal stack interference between ignition device 44 and tower assembly 42. In the exemplary embodiment, cooling air, at recuperator discharge temperature, is supplied from passageways 60 and 62 into ignition device assembly 40 through metering openings 140 and into gap 79. A portion 182 of cooling air 180 channeled into gap 130 is discharged from gap 130 through openings 164 wherein air 180 impinges against tower inner surface 78 within the upstream portion 70 of tower assembly 42, and provides a channel flow to ventilate gap 79.

A portion 184 of cooling air is also discharged from gap 130 through openings 162, wherein air 184 impinges against tower inner surface 78 within the downstream portion 72 of tower assembly 42, and contributes to the channel flow through ventilate gap 79. Moreover, as cooling air 184 is discharged through openings 162, air 184 provides external film cooling for ignition device body 136 and tip portion 134. The remaining cooling air 186 is discharged through tip portion cooling openings 150 and tip openings 154. Air flow through openings 150 and 154 provides blow-off air to facilitate preventing hot combustion gases from attaching to ignition device face 156. As a result, the cooling scheme described herein, facilitates reducing the operating temperature of ignition device 44 and tower assembly 42, thus extending a useful life of ignition device assembly 40.

The above-described ignition device assembly cooling scheme provides a cost-effective and reliable means for operating a combustor including an ignition device. More specifically, the ignition device includes a shroud that facilitates shielding the tip end of the ignition device from high temperatures generated within the combustor. Moreover the shroud includes a plurality of metering openings that meter the cooling airflow to the ignition device, and a plurality of different cooling air outlets which enable cooling air to impinge the surrounding tower assembly. As a result, the cooling air facilitates impingement cooling of the tower assembly, and film cooling of the ignition device. Furthermore, the continuous discharge of cooling air facilitates preventing the ingestion of hot combustion gases within the gap defined between the shroud and the ignition device. As a result, a cooling scheme is provided which facilitates reducing an operating temperature of the ignition device assembly, thus extending a useful life of the ignition device assembly in a cost-effective and reliable manner.

An exemplary embodiment of a combustion system is described above in detail. The combustion system components illustrated are not limited to the specific embodiments described herein, but rather, components of each combustion system may be utilized independently and separately from other components described herein. For example, the cooling scheme may be used with other ignition assemblies or in combination with other engine combustion systems.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

coupling a combustor including a dome assembly and a combustor liner that extends downstream from the dome assembly to a combustor casing that is positioned radially outwardly from the combustor;

providing an ignition device that includes a body and a shroud that extends circumferentially around at least a portion of the body and extends axially from a first end to a tip end, wherein a gap is defined between the shroud and the body;

inserting the ignition device at least partially through a tower assembly coupled to the combustor such that a tip portion of the device is positioned upstream from the tip end, and downstream from a body portion that extends between the first end and the tip portion; and securing the ignition device within the tower assembly such that a plurality of metering openings formed within the shroud body portion are in flow communication with a cooling source for channeling cooling air into the gap, and such that a portion of the cooling air is discharged from the gap through a plurality of first cooling openings formed within the body portion, and such that a portion of the cooling air is channeled from the gap through a plurality of discharge openings formed within the shroud tip portion.

2. A method in accordance with claim 1 wherein securing the ignition device within the tower assembly further comprises securing the ignition device within the tower assembly such that cooling air discharged from the plurality of first cooling openings impinges an inner surface of the tower to facilitate cooling of the tower.

3. A method in accordance with claim 1 wherein securing the ignition device within the tower assembly further comprises securing the ignition device within the tower assembly such that a portion of cooling air is also discharged from the gap through a plurality of tip cooling openings formed in the shroud tip portion such that the openings extend between the tip end and the gap.

4. A method in accordance with claim 1 wherein securing the ignition device within the tower assembly further comprises securing the ignition device within the tower assembly such that a portion of cooling air discharged from the gap facilitates preventing combustion gases from flowing upstream into the gap.

5. A method in accordance with claim 1 wherein securing the ignition device within the tower assembly further comprises securing the ignition device within the tower assembly such that a portion of cooling air is also discharged through a plurality of second cooling openings that are formed within the shroud body and are a distance upstream from the plurality of first cooling openings and a distance downstream from the plurality of metering openings.

6. A method in accordance with claim 1 wherein securing the ignition device within the tower assembly further comprises securing the ignition device within the tower assembly such that a portion of cooling air discharged from the gap facilitates increasing a useful life of the ignition device.

7. An ignition device assembly for a gas turbine engine combustor, said ignition device comprising a body and a shroud, said body extending from an inlet end to an outlet end, said shroud extending circumferentially around at least a portion of said body, and extending from a first end to a tip end, said shroud comprises a tip portion and a body portion, said tip portion extending from said tip end to said body portion, and said body portion extending from said tip portion to said first end, said body portion comprising a plurality of metering openings and a plurality of first outlet openings, said plurality of metering openings for channeling cooling air to said ignition device body, said plurality of first outlet openings for channeling spent cooling air from said ignition device body, said tip portion comprising a plurality of discharge openings extending therethrough for channeling cooling air from said ignition device body, said plurality of first outlet openings between said shroud tip portion and said plurality of shroud metering openings.

8. An ignition device assembly in accordance with claim 7 wherein said ignition device body comprises a centerline axis of symmetry, said shroud is coupled radially outwardly from, and substantially co-axially to, said ignition device body such that a gap is defined between said shroud and said ignition device body.

9. An ignition device assembly in accordance with claim 8 wherein said plurality of first outlet openings and said plurality of metering openings facilitate reducing an operating temperature of said ignition device body.

10. An ignition device assembly in accordance with claim 9 wherein said plurality of metering openings are coupled in flow communication to said gap for channeling cooling air into said gap.

11. An ignition device assembly in accordance with claim 8 wherein said shroud tip portion further comprises a plurality of tip cooling openings extending from said tip end into flow communication with said gap, said tip cooling openings are substantially parallel to said ignition body centerline axis of symmetry, said plurality of first outlet openings are obliquely oriented with respect to said centerline axis of symmetry.

12. An ignition device assembly in accordance with claim 8 wherein said shroud body portion further comprises a plurality of second outlet openings extending therethrough, said plurality of second outlet openings are a distance upstream from said plurality of first outlet openings, and are between said plurality of metering openings and said plurality of first outlet openings.

13. An ignition device assembly in accordance with claim 12 wherein said plurality of second outlet openings facilitate film cooling of an external surface of said shroud body.

14. A combustion system for a gas turbine engine, said combustion system comprising:

a combustor comprising a dome assembly and a combustor liner extending downstream from said dome assembly, said combustor liner defining a combustion chamber therein;

a combustor casing extending around said combustor; and an ignition device assembly extending partially through said combustor casing and said dome assembly, said ignition device comprising a body and a shroud, said body extending from an inlet end to an outlet end, said shroud extending circumferentially around at least a portion of said ignition device body, and extending axially from a first end to a tip end, said shroud comprises a tip portion and a body portion, said shroud tip portion extends from said tip end to said body portion, and said body portion extending from said tip portion to said first end, said body portion comprising a plurality of metering openings and a plurality of first outlet openings, said plurality of metering openings for channeling cooling air to said ignition device assembly body, said plurality of first outlet openings are for channeling spent cooling air from said ignition device assembly body, said tip portion comprises a plurality of discharge openings extending therethrough for channeling cooling air from said ignition device body, said plurality of first outlet openings are between said shroud tip portion and said plurality of shroud metering openings.

15. A combustion system in accordance with claim 14 wherein said dome assembly further comprises an annular support tower, said ignition device body extends substantially concentrically through said support tower and comprises a centerline axis of symmetry, said shroud is coupled radially outwardly from, and substantially coaxially to, said ignition device body such that a gap is defined between said shroud and said ignition device body.

16. A combustion system in accordance with claim 15 wherein said ignition device assembly plurality of first outlet openings and said plurality of metering openings are coupled in flow communication with said gap, said plurality of first outlet openings are configured to discharge cooling air therefrom for impinging against said support tower.

17. A combustion system in accordance with claim 15 wherein said ignition device assembly plurality of first outlet openings and said plurality of metering openings are coupled in flow communication with said gap, said plurality of first outlet openings are configured to discharge cooling air therefrom to facilitate film cooling across an external surface of said ignition device body.

18. A combustion system in accordance with claim 15 wherein said ignition device shroud tip portion comprises a plurality of tip cooling openings extending between said tip end and said gap, said tip cooling openings are substantially parallel to said ignition body centerline axis of symmetry, said plurality of first outlet openings are obliquely oriented with respect to said centerline axis of symmetry.

19. A combustion system in accordance with claim 18 wherein said plurality of tip cooling openings and said first outlet openings facilitate preventing combustion gases from entering said gap from said combustion chamber.

20. A combustion system in accordance with claim 15 wherein said ignition device shroud body portion further comprises a plurality of second outlet openings extending therethrough, said plurality of second outlet openings are a distance upstream from said plurality of first outlet openings, and are between said plurality of metering openings and said plurality of first outlet openings.

* * * * *

UNITED STATES PATENT AND TRADEMARK OFFICE
CERTIFICATE OF CORRECTION

| | | |
|---|---|---|
| PATENT NO. | : 7,216,488 B2 | Page 1 of 1 |
| APPLICATION NO. | : 10/894483 | |
| DATED | : May 15, 2007 | |
| INVENTOR(S) | : Howell et al. | |

It is certified that error appears in the above-identified patent and that said Letters Patent is hereby corrected as shown below:

Column 8, line 61, delete "air ftom said" and insert therefor -- air from said --.

Signed and Sealed this

Twentieth Day of November, 2007

JON W. DUDAS
*Director of the United States Patent and Trademark Office*